United States Patent  (10) Patent No.: US 9,491,281 B2
Kim et al.                (45) Date of Patent:      Nov. 8, 2016

(54) APPARATUS AND METHOD FOR DISPLAYING UNCHECKED MESSAGES IN A TERMINAL

(71) Applicant: Samsung Electronics Co., Ltd., Gyeonggi-do (KR)

(72) Inventors: Geon-Soo Kim, Gyeonggi-do (KR); Yong-Joon Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 169 days.

(21) Appl. No.: 13/974,536

(22) Filed: Aug. 23, 2013

(65) Prior Publication Data

US 2014/0315522 A1    Oct. 23, 2014

(30) Foreign Application Priority Data

Apr. 19, 2013 (KR) .................. 10-2013-0043791

(51) Int. Cl.
    *H04M 1/725*    (2006.01)
(52) U.S. Cl.
    CPC ..... *H04M 1/72586* (2013.01); *H04M 1/72552* (2013.01)
(58) Field of Classification Search
    CPC ............... H04N 2005/441; H04N 21/42209; H04N 21/4882; H04N 17/211; H04N 2203/04803; G06F 3/0481; G06F 3/0482; G06F 9/4443; G06F 17/211; G06F 2203/04803
    See application file for complete search history.

(56) References Cited

U.S. PATENT DOCUMENTS

| | | | |
|---|---|---|---|
| 8,725,813 B2* | 5/2014 | Nalliah et al. | 709/206 |
| 2012/0254770 A1* | 10/2012 | Ophir | G06F 3/0481 715/752 |
| 2015/0201062 A1* | 7/2015 | Shih | G06F 17/30876 455/564 |

FOREIGN PATENT DOCUMENTS

| | | |
|---|---|---|
| KR | 10-2005-0077879 A | 8/2005 |
| KR | 10-2006-0044221 A | 5/2006 |
| KR | 10-2006-0059463 A | 6/2006 |
| KR | 10-2006-0061601 A | 6/2006 |

OTHER PUBLICATIONS

"Nav—Unread panel in Gmail." Navjot Pawera. Aug 22, 2010. Accessed via http://www.navjotpawera.com/blog/2010/08/22/un-read-panel-in-gmail/ on Apr. 13, 2015.*

(Continued)

*Primary Examiner* — Antonio A Caschera
(74) *Attorney, Agent, or Firm* — Cha & Reiter, LLC

(57) ABSTRACT

An apparatus and a method for displaying unchecked messages in a terminal, which can clearly and concisely display the unchecked messages. The apparatus includes: a display unit including a $1^{st}$ region displaying unchecked messages and a $2^{nd}$ region displaying checked messages in an unchecked message arrangement mode; and a controller that controls the display unit to arrange and display the unchecked messages according to predetermined priorities in the $1^{st}$ region in the unchecked message arrangement mode.

14 Claims, 7 Drawing Sheets

(56) References Cited

OTHER PUBLICATIONS

"Gmail Help—Importance ranking and markers" Sep 1, 2010. Accessed via https://support.google.com/mail/answer/186543?hl=en on Apr 13, 2015.*

"How to Clean out Your Gmail Inbox—WikiHow" Aug. 23, 2009. Accessed via http://www.wikihow.com/Clean-out-Your-Gmail-Inbox on Apr. 13, 2015.*

"Verizon Webmail Help—Verizon Webmail" Dec. 25, 2007. Accessed via http://www.verizon.net/micro/webmail/help/webmail_help.htm on Apr. 14, 2015.*

"Official Gmail Blog: New in Labs: Preview Pane," Posted by Maciek Nowakowski, on Thursday, Aug. 4, 2011 via the Web @ http://gmailblog.blogspot.com/2011/08/new-in-labs-preview-pane.html.*

* cited by examiner

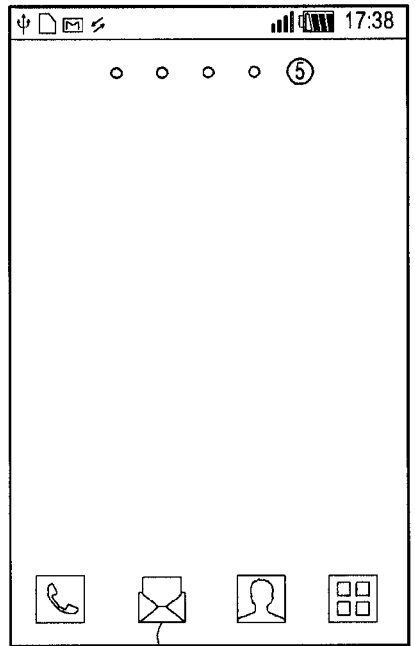
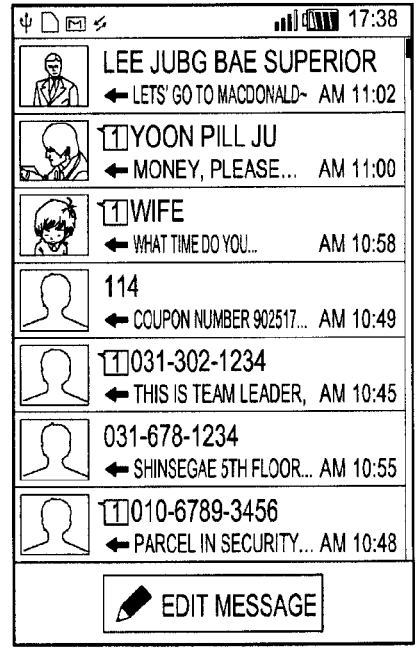
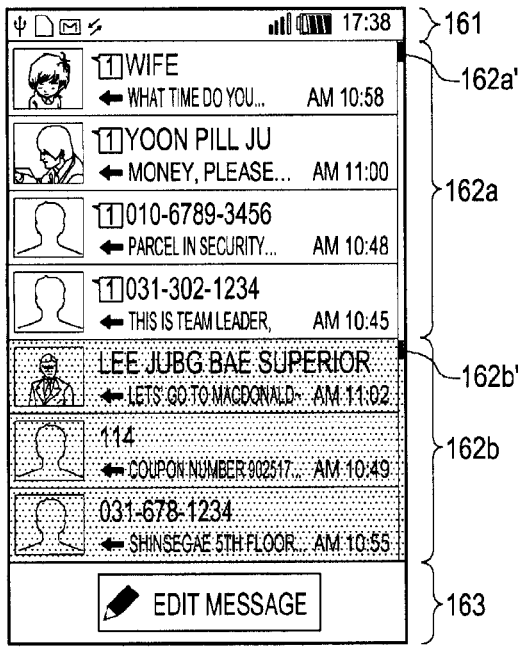
FIG.3A  FIG.3B
FIG.3C

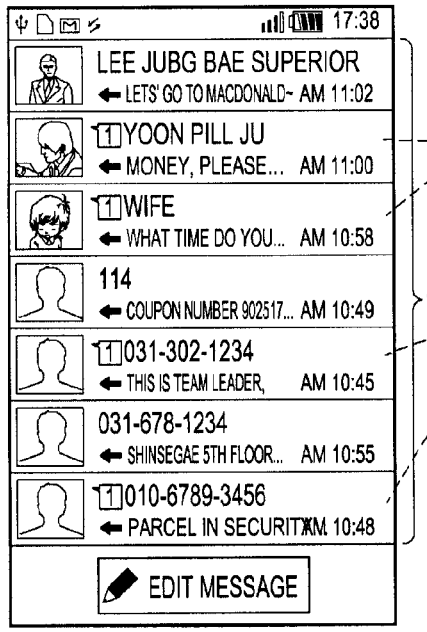 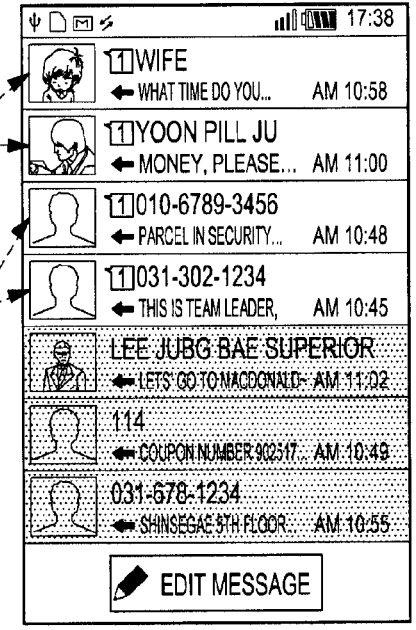
FIG.6A  FIG.6B
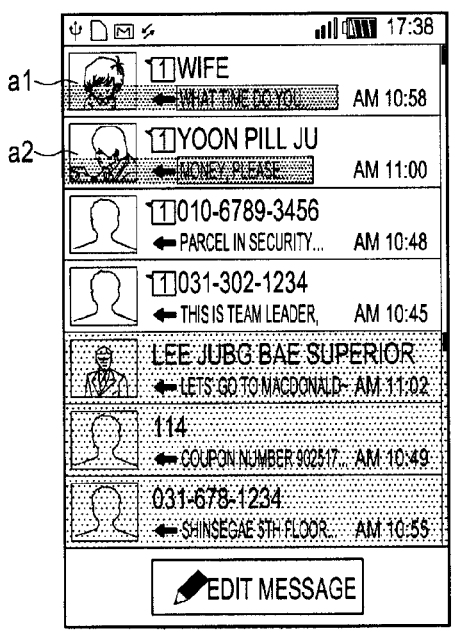 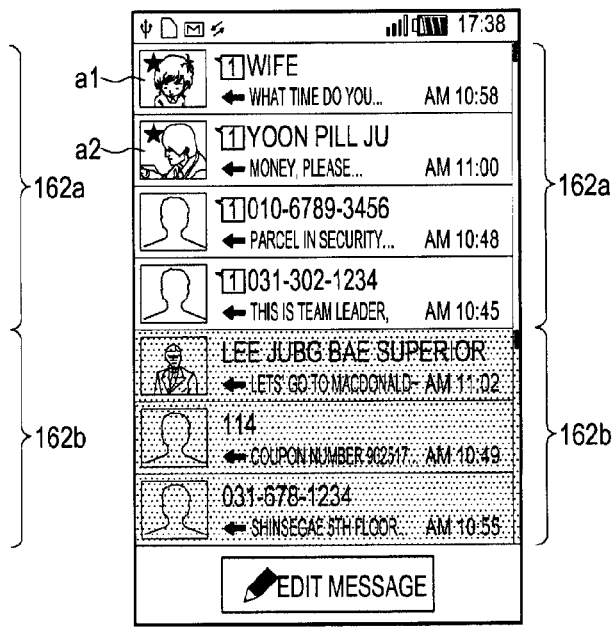
FIG.7A  FIG.7B

APPARATUS AND METHOD FOR DISPLAYING UNCHECKED MESSAGES IN A TERMINAL

This application claims priority under 35 U.S.C. §119(a) from Korean Application Serial No. 10-2013-0043791, which was filed in the Korean Intellectual Property Office on Apr. 19, 2013, the entire content of which is hereby incorporated by reference.

BACKGROUND

1. Field of the Invention

The present disclosure relates to an apparatus and a method for displaying unchecked messages in a terminal, and more particularly, to an apparatus and a method which can clearly and concisely display unchecked messages in a terminal.

2. Description of the Related Art

An unchecked message received in a terminal is simply displayed on an upper part of a message list according to a received time order or a basic arrangement order, and there exists no specific method for arranging unchecked messages.

Therefore, it is difficult either to concisely display only unchecked messages in a terminal or to collectively examine or process only unchecked messages. Further, even in a situation when an important message is included among the unchecked messages, the unchecked important messages cannot be notified intuitively to a user since the important messages are displayed according to a time order or basic arrangement order in the same manner as unwanted or unsolicited, i.e., spam, messages.

SUMMARY

Accordingly, an aspect of the present invention is to provide an apparatus and a method for displaying unchecked messages in a terminal, which can clearly and concisely display the unchecked messages.

Another aspect of the present invention is to provide an apparatus and a method for displaying unchecked messages in a terminal, which can collectively process the unchecked messages.

Another aspect of the present invention is to provide an apparatus and a method for displaying unchecked messages in a terminal, which can arrange and display the unchecked messages according to priorities.

In accordance with another aspect of the present invention, an apparatus for displaying unchecked messages in a terminal includes: a display unit including a $1^{st}$ region displaying unchecked messages arranged according to predetermined priorities and a $2^{nd}$ region displaying checked messages; and a controller that controls the display unit to arrange and display the unchecked messages according to predetermined priorities in the $1^{st}$.

In accordance with another aspect of the present invention, a method of displaying unchecked messages in a terminal includes: preparing a display unit including a $1^{st}$ region and a $2^{nd}$ region; arranging and displaying unchecked messages according to predetermined priorities in the $1^{st}$ region and displaying checked messages in the $2^{nd}$ region.

As used throughout the present specification and claims, the term "unchecked" is understood to mean received by the terminal, but not yet viewed by a user. In one embodiment, a message is unchecked until displayed; thus automatically becoming "checked" upon being shown to a user. Alternatively, a message can remain unchecked until either selected by a user or until a particular predetermined command is generated to change the status of the message from unchecked to checked.

Moreover, while the present description may characterize the messages as being e-mail or telephone calls, it is understood that such messages can be any type of message typically shown to a user from any application on the terminal.

BRIEF DESCRIPTION OF THE DRAWINGS

The above and other aspects, features, and advantages of the present invention will be more apparent from the following detailed description taken in conjunction with the accompanying drawings, in which:

FIGS. 3A, 3B and 3C are views for describing a shift into an unchecked message arrangement mode in a terminal according to various embodiments of the present invention;

FIGS. 6A and 6B are views for describing an operation of arrangement in an unchecked message arrangement mode of a terminal according to various exemplary embodiments of the present invention;

FIGS. 7A and 7B are views for describing an operation of discriminatively displaying unchecked messages depending on priorities in an unchecked message arrangement mode of a terminal according to various exemplary embodiments of the present invention;

DETAILED DESCRIPTION

Figure 1:
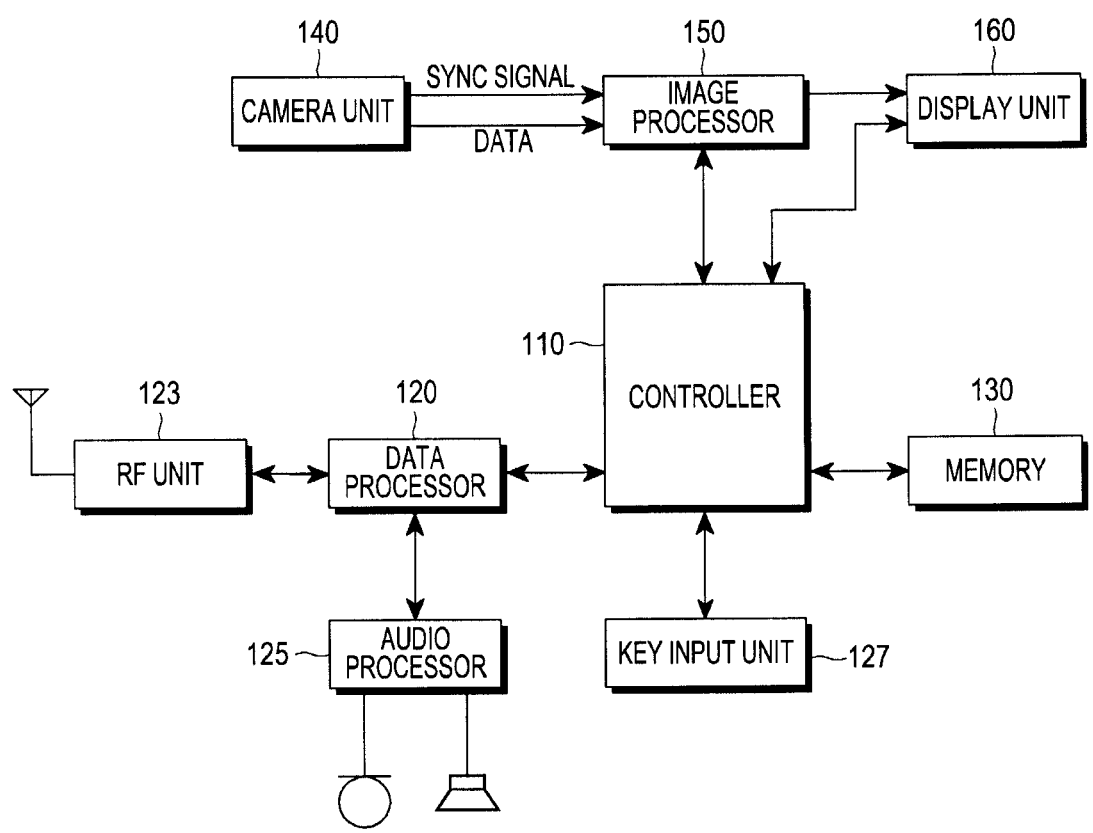
FIG. 1 is a block diagram illustrating the construction of a terminal according to various embodiments of the present invention.

Hereinafter, exemplary embodiments of the present invention will be described with reference to the accompanying drawings. The same elements in the drawings will be designated by the same reference numerals as possible although they are shown in different drawings.

A terminal according to various exemplary embodiments of the present invention may be a portable terminal or a fixed terminal. The portable terminal is an electronic apparatus that can be carried conveniently and may include, for example, a video phone, a mobile phone, a smart phone, a WCDMA terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (Notebook, Tablet and the like), a digital camera, and the like. The fixed terminal may include a desktop personal computer and the like. FIG. 1 is a block diagram illustrating the construction of a terminal according to various embodiments of the present invention.

Referring to FIG. 1, a controller 110 performs a function of controlling general operations of the terminal.

An RF unit 123 performs a wireless communication function of the terminal The RF unit 123 most often includes an RF transmitter for up-converting and amplifying a frequency of a transmitted signal and an RF receiver for low noise-amplifying a received signal and down-converting a frequency of the received signal.

A data processor 120, which may be part of the controller 110, includes a transmitter for encoding and modulating the transmitted signal and a receiver for demodulating and decoding the received signal. The data processor 120 may be configured by a MOdulator/DEModulator (MODEM) and a COder/DECoder (CODEC). The CODEC includes a data CODEC that processes packet data and the like, and an audio CODEC that processes an audio signal such as voice and the like. An audio processor 125 performs a function of playing a received audio signal output from the audio CODEC of the data processor 120 or transmitting an audio signal produced by a microphone to the audio CODEC of the data processor 120.

A key input unit 127 provides keys to input number or letter information and functional keys to configure various functions.

A memory 130 may include a program memory and a data memory. The program memory may store programs for controlling programs to control general operations of a terminal and programs for controlling to arrange and display unchecked messages according to predetermined priorities. Further, the data memory may perform a function of temporarily storing data produced during execution of the programs.

In an unchecked message arrangement mode according to various exemplary embodiments of the present invention, the controller 110 divides a screen region of a display unit 160 into a $1^{st}$ region and a $2^{nd}$ region. Then, the controller 110 displays the unchecked messages in the $1^{st}$ region according to predetermined priorities, while displaying checked messages in the $2^{nd}$ region.

In this event, the controller 110 may shift into the unchecked message arrangement mode through at least one of a specific button selection, a specific menu selection, and a moving gesture of the terminal In the unchecked message arrangement mode of one embodiment, when the number of unchecked messages to be displayed in the $1^{st}$ region is larger than a preset number for display in the $1^{st}$ region, the controller 110 controls to display a scroll bar for displaying unchecked messages that are not being displayed in the $1^{st}$ region. Further, in the unchecked message arrangement mode of this embodiment, when the number of checked messages to be displayed in the $2^{nd}$ region is larger than a preset number for display in the $2^{nd}$ region, the controller 110 controls to display a scroll bar for displaying checked messages that are not being displayed in the $2^{nd}$ region.

The controller 110 often provides a scroll bar to each of the $1^{st}$ region and the $2^{nd}$ region and controls the operation of each of the $1^{st}$ region and the $2^{nd}$ region.

Further, the controller 110 may opaquely display the $2^{nd}$ region displaying the checked messages to discriminate between the $1^{st}$ region and the $2^{nd}$ region.

In one embodiment, the controller 110 determines the priorities of phone numbers in a sequence of a phone number preset as a favorite phone number or a phone number received more than a threshold number of times within a predetermined period among phone numbers stored in a phone book of the terminal; a phone number stored in the phone book; a phone number which has been received more than a threshold number of times within predetermined period but is not stored in the phone book; and a phone number not stored in the phone book. Then, the controller 110 controls to arrange and display the unchecked messages according to the determined priorities in the $1^{st}$ region.

Further, in displaying the unchecked messages arranged according to the predetermined priorities in the $1^{st}$ region, the controller 110 enables the display to show discrimination between an unchecked message of a high priority and an unchecked message of a low priority. For example, the controller 110 may highlight or mark a specific icon on an unchecked message of a high priority, to inform a user of existence of an important message among the unchecked messages.

Further, according to various exemplary embodiments, when a batch process menu view (including delete, spam, and read process) is selected in the unchecked message arrangement mode, the controller 110 controls to display a checkbox for each of the unchecked messages in the $1^{st}$ region. Then, when one specific batch menu is selected among the batch process menus, the processor 110 collectively performs the function(s) corresponding to the specific batch menu with respect to unchecked messages with checked checkboxes.

Further, according to various exemplary embodiments, when a specific message in the $1^{st}$ region is selected and processed in the unchecked message arrangement mode, the controller 110 controls the processed specific message to be arranged in the $2^{nd}$ region as a last checked message. Further, when the processed specific message is arranged and displayed in the $2^{nd}$ region, if the number of unchecked messages to be displayed in the $1^{st}$ region is smaller than a preset number for display in the $1^{st}$ region, the controller 110 expands the $2^{nd}$ region so as to additionally display checked message.

Further, according to various exemplary embodiments, when a line separating the $1^{st}$ region and the $2^{nd}$ region is dragged to an end of the $2^{nd}$ region under a condition of maintaining a touch on the line in the unchecked message arrangement mode, the controller 110 controls to display only unchecked messages in the screen region of the display unit 160.

Further, according to various exemplary embodiments, when the line separating the $1^{st}$ region and the $2^{nd}$ region is dragged to an end of the $1^{st}$ region under a condition of maintaining a touch on the line in the unchecked message arrangement mode, the controller 110 controls to release the unchecked message arrangement mode.

A camera unit 140 typically includes a camera sensor for capturing image data and converting a captured optical signal to an electrical signal and a signal processor for converting an analogue image signal captured by the camera sensor to digital data. Here, it is assumed that the camera sensor is a CCD or a CMOS sensor, and the signal processor may be implemented by a Digital Signal Processor (DSP). The camera sensor and the signal processor may be implemented either in an integral form or in a separated form.

An image processor 150 performs Image Signal Processing (ISP) to display an image signal output from the camera unit 140. The ISP performs functions, such as gamma correction, interpolation, spatial change, image effect, image scale, AWB, AE, AF and the like. Thus, the image processor 150 processes image signals output from the camera unit 140 in units of frames and outputs the frame image data in accordance with the characteristics and size of the display unit 160. Further, the image processor 150 includes an image codec and performs a function of compressing frame image data displayed on the display unit 160 according to a set scheme or reconstructing compressed frame image data to original frame image data. Here, the image codec may be JPEG codec, MPEG4 codec, Wavelet codec and the like. It is assumed that the image processor 150 has a function of On-Screen Display (OSD) and may output OSD data according to the size of a screen displayed under the control of the controller 110.

The display unit 160 typically displays an image signal output from the image processor 150 on a screen, and displays user data output from the controller 110. The display unit 160 may employ a Liquid Crystal Display (LCD) or any other conventional (or later developed) screen technology. In this event, the display unit 160 may include an LCD controller, a memory to store image data, and an LCD display device. When the LCD is implemented in a touch screen type, the LCD may operate as input unit. Then, the display unit 160 may display keys like the key input unit 127 on the display unit 160.

Further, when the display unit 160 is implemented in a touch screen type and is thus used as a touch screen unit, the touch screen unit is preferably configured by a Touch Screen Panel (TSP) including a plurality of sensor panels. The plurality of sensor panels may include a capacitive sensor panel that can detect a finger touch and an electro-inductive sensor panel that can detect a minute touch like a touch pen.

Further, in an unchecked message arrangement mode according to various exemplary embodiments of the present invention, the display unit 160 is divided into a $1^{st}$ region and a $2^{nd}$ region. Unchecked messages are displayed in the $1^{st}$ region and checked messages are displayed in the $2^{nd}$ region.

An operation of displaying an unchecked message in a terminal as above will be described in detail with reference to FIGS. 2A through 9.

In various exemplary embodiments of the present invention described above, when the terminal is in a portrait mode, unchecked messages are displayed in the upper region as a $1^{st}$ region while checked messages are displayed in a lower region as a $2^{nd}$ region. However, checked messages may be displayed in the upper region as the $2^{nd}$ region while unchecked messages are displayed in the lower region as the $1^{st}$ region.

Further, in various exemplary embodiments of the present invention, when the terminal is in a landscape mode, i.e., other than the portrait mode, a left side region or a right side region may be used as the $1^{st}$ region for displaying unchecked messages while the other side region of the left or right side region is used as the $2^{nd}$ region for displaying checked messages.

Figure 2A:
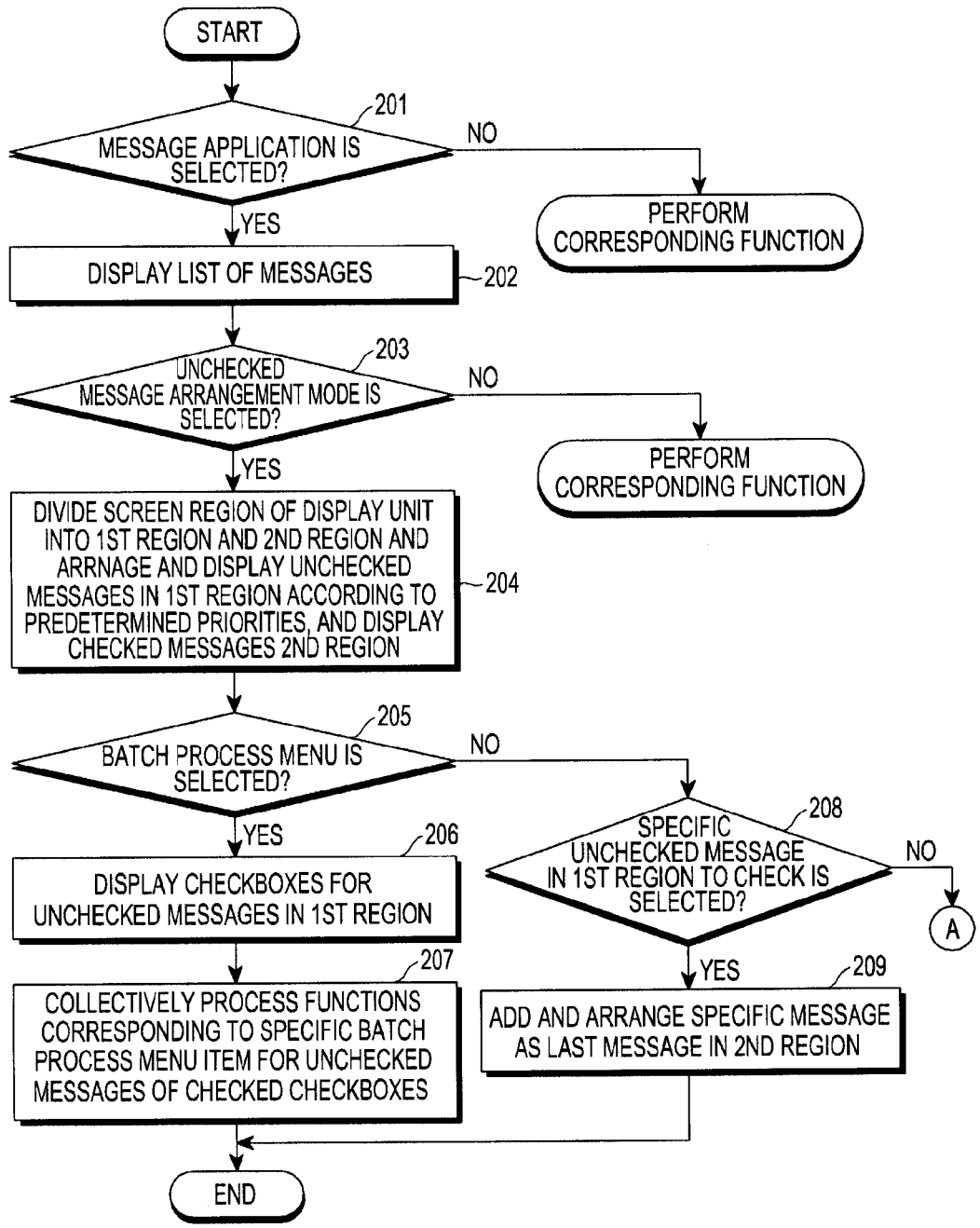
FIGS. 2A and 2B are flowcharts illustrating an operation of controlling unchecked message in terminal according to various exemplary embodiments of the present invention.
Figure 2B:
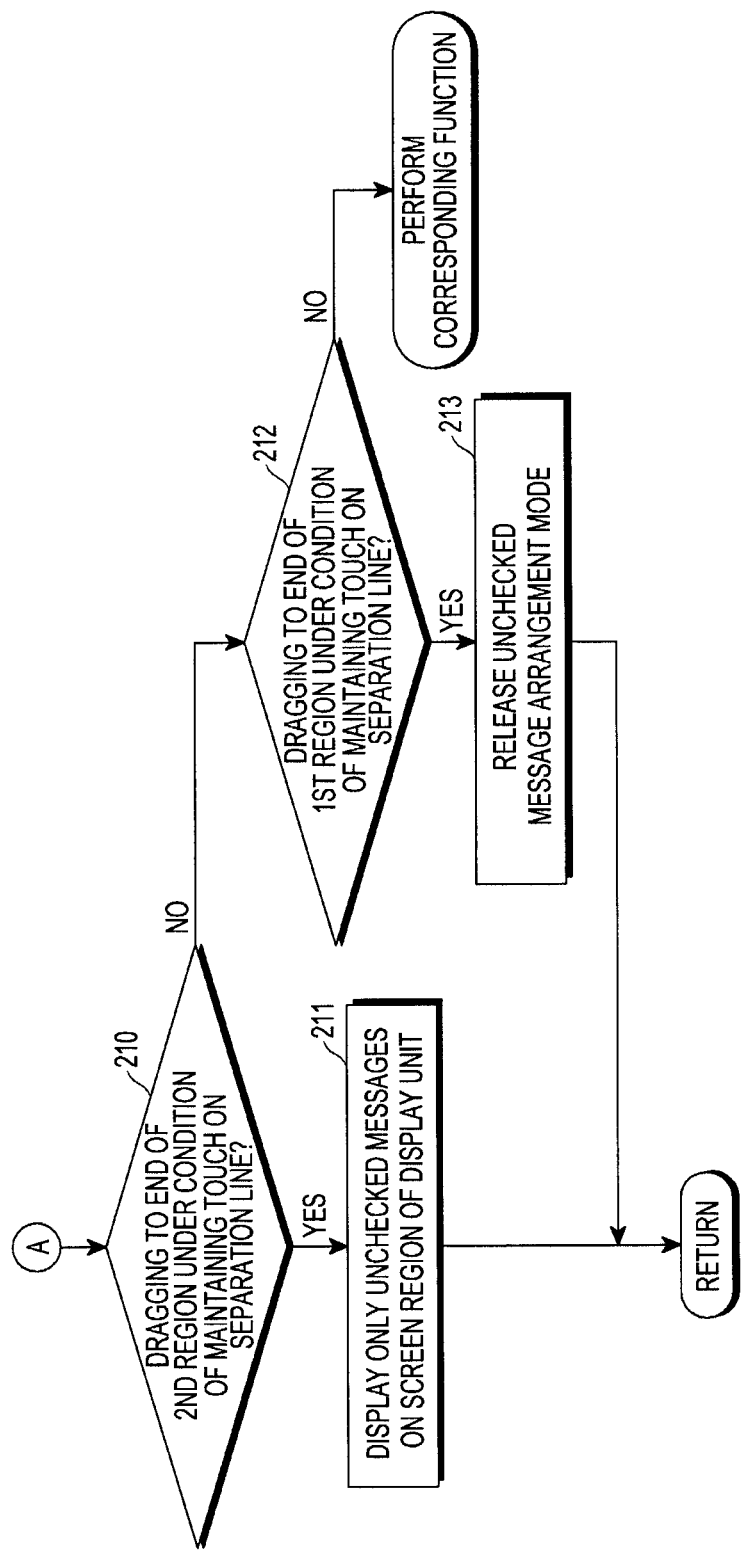
Figure 4A:
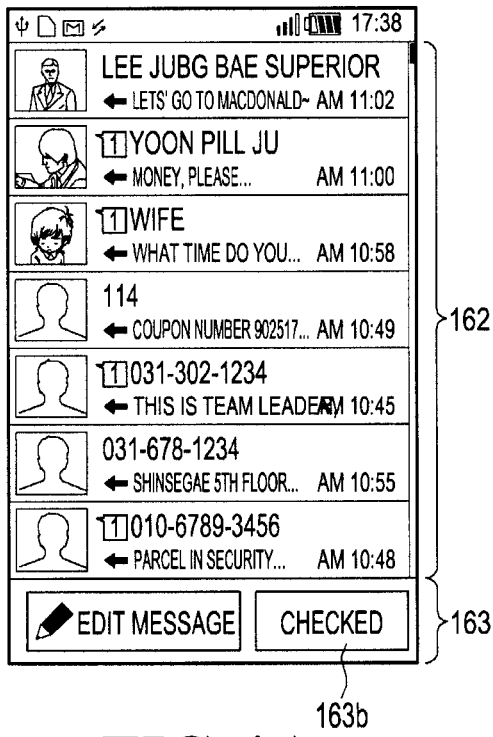
FIGS. 4A and 4B are views for describing an operation of shift into an unchecked message arrangement mode through selection of a specific button in a terminal according to various exemplary embodiments of the present invention.
Figure 4B:
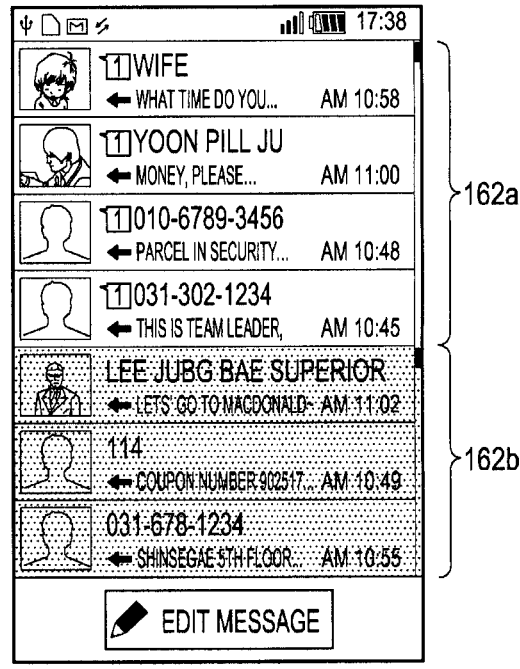
Figure 5A:
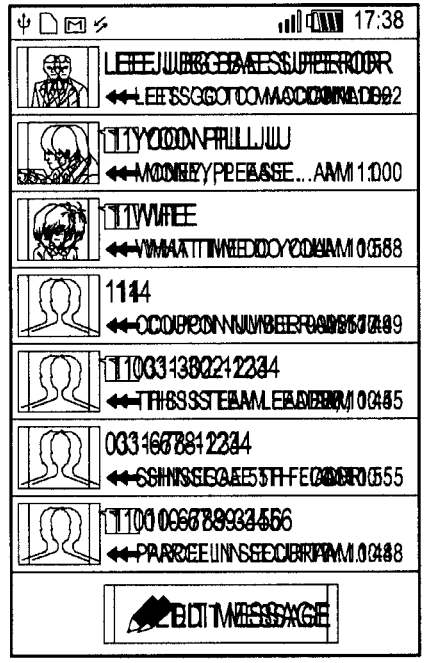
FIGS. 5A and 5B are views for describing an operation of shift into an unchecked message arrangement mode depending on a movement gesture in a terminal according to various exemplary embodiments of the present invention.
Figure 5B:
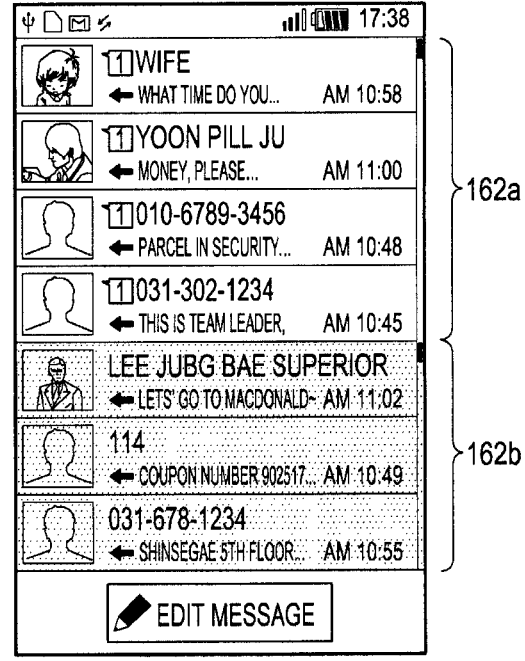
Figure 8A:
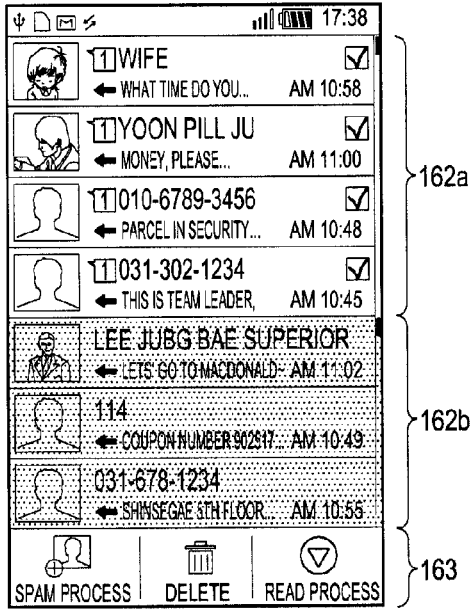
FIGS. 8A and 8B are views for describing an operation of batch-processing unchecked messages in an unchecked message arrangement mode of a terminal according to various exemplary embodiments of the present invention.
Figure 8B:
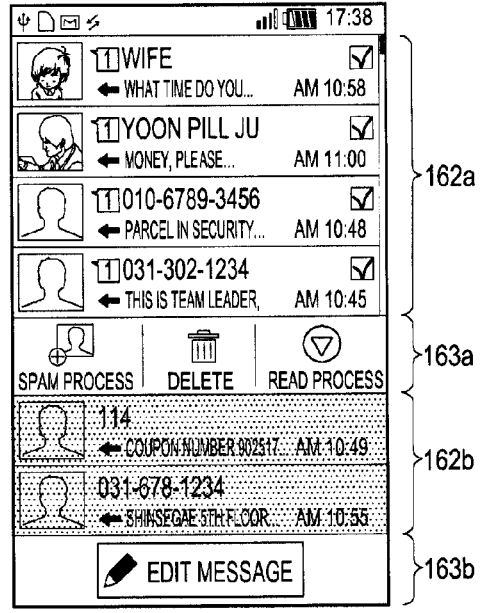
Figure 9A:
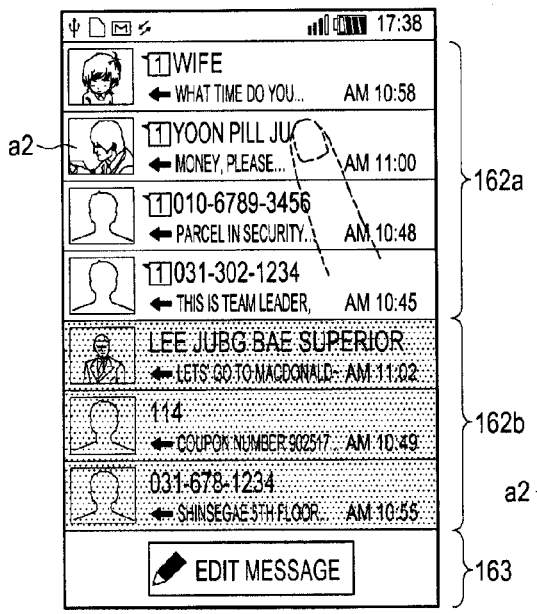
FIG. 9A and FIG. 9B are views for describing an operation of selecting unchecked messages in an unchecked message arrangement mode of a terminal according to various exemplary embodiments of the present invention.
Figure 9B:
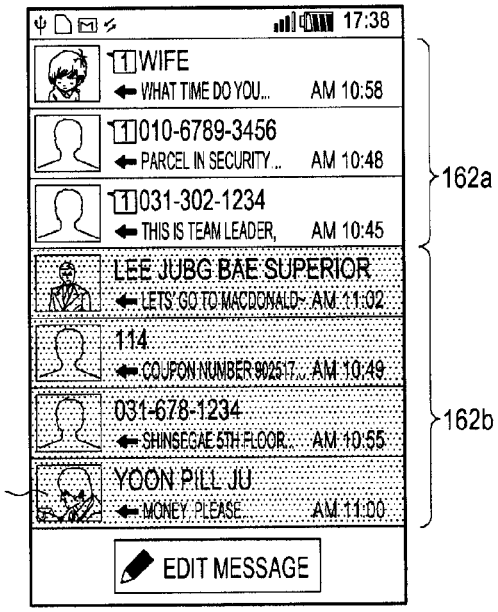

FIGS. 2A and 2B are flowcharts illustrating an operation of controlling unchecked message in terminal according to various exemplary embodiments of the present invention. FIGS. 3A through 3C are views for describing a shift into an unchecked message arrangement mode in a terminal according to various embodiments of the present invention. FIGS. 4A and 4B are views for describing an operation of shift into an unchecked message arrangement mode through selection of a specific button in a terminal according to various exemplary embodiments of the present invention. FIGS. 5A and 5B are views for describing an operation of shift into an unchecked message arrangement mode depending on a movement gesture in a terminal according to various exemplary embodiments of the present invention. FIGS. 6A and 6B are views for describing an operation of arrangement in an unchecked message arrangement mode of a terminal according to various exemplary embodiments of the present invention. FIGS. 7A and 7B are views for describing an operation of discriminatively displaying unchecked messages depending on priorities in an unchecked message arrangement mode of a terminal according to various exemplary embodiments of the present invention. FIGS. 8A and 8B are views for describing an operation of batch-processing unchecked messages in an unchecked message arrangement mode of a terminal according to various exemplary embodiments of the present invention. FIG. 9A and FIG. 9B are views for describing an operation of selecting unchecked messages in an unchecked message arrangement mode of a terminal according to various exemplary embodiments of the present invention.

Hereinafter, an exemplary embodiment of the present invention will be described in detail with reference to FIG. 1.

Referring to FIGS. 2A and 2B, when a message application is selected in a terminal, the controller 110 detects the selection in step 201 and then proceeds to step 202 in which the controller 110 displays a list of transmitted or received messages in a screen region of the display unit 160.

In step 203, the unchecked message arrangement mode is selected and detected by the controller 110 while the list of messages is displayed. Then, in step 204, the controller 110 divides the screen region of the display unit 160 into a $1^{st}$ region and a $2^{nd}$ region, arranges and displays unchecked messages in the $1^{st}$ region according to predetermined priorities, and displays checked messages in the $2^{nd}$ region. As a result, the controller 110 displays all the checked messages in the $2^{nd}$ region, while the sorted unchecked messages are displayed in the $1^{st}$ region.

First, as shown in FIG. 3A, when an icon 301 indicating a message application is selected, e.g., in a standby mode, the controller 110 shifts to a message mode and displays a list of transmitted or received messages as shown in FIG. 3B. In this event, the display unit 160 includes an indication region 161 (or status bar), a screen region 162 and a button region 163. Terminal information, such as time information, reception intensity, battery balance and the like may be displayed in the indication region 161. A list of transmitted or received messages may be displayed in the screen region 162. A menu or buttons, which can control messages in message mode, may be displayed in the button region 163.

Although displayed in a horizontal configuration, in other embodiments, one or more of regions can be vertical. For example, the button region 163 can be disposed adjacent to the screen region 162, such that it extends downward from the indication region 161. Such an arrangement may allow for easier selection and manipulation of the data in the screen region 162.

Therefore, when the unchecked message arrangement mode is selected while a list of messages is displayed in the screen region 162 as shown in FIG. 3B, the controller 110 may divide the screen region 162 into a $1^{st}$ region 162a and a $2^{nd}$ region 162b as shown in FIG. 3C and then discriminatively display unchecked messages and checked messages in the $1^{st}$ region 162a and the $2^{nd}$ region 162b, respectively.

Further, the controller 110 may opaquely display the $2^{nd}$ region so as to enable the $1^{st}$ region and the $2^{nd}$ region to be discriminated from each other. In this embodiment, the $1^{st}$ region 162a and the $2^{nd}$ region 162b may be distinguished by being provided with different visual features. More particularly, for example, one region may have bolded or italicized text or may be highlighted or shaded to allow for quick differentiation by a user.

Further, as shown in FIG. 3C, when the number of unchecked messages to be displayed in the $1^{st}$ region 162a is larger than a predetermined number for the displaying in the $1^{st}$ region 162a, the controller 110 may display a scroll bar 162a' which enables unchecked messages that are not being displayed in the $1^{st}$ region 162a to be displayed in the $1^{st}$ region 162a. Also, when the number of checked messages to be displayed in the $2^{nd}$ region 162b is larger than a predetermined number for the displaying in the $2^{nd}$ region 162b, the controller 110 may display a scroll bar 162b' which enables checked messages that are not being displayed in the $2^{nd}$ region 162b to be displayed in the $2^{nd}$ region 162b.

Therefore, the controller 110 may control operations of the $1^{st}$ region 162a and the $2^{nd}$ region 162b, respectively.

In another embodiment, the $1^{st}$ region 162a and the second region 162b may also be controlled independently, depending upon the number of messages in each. For example, if the $1^{st}$ region 162a contains twelve messages (and the predetermined number is four) and the $2^{nd}$ region 162b contains two messages (and the predetermined number is five), the controller can display the $1^{st}$ region scroll bar 162a' (allowing a user to scroll between the twelve messages displayed therein), while eliminating the $2^{nd}$ region scroll bar 162b', because no scrolling is necessary.

Further, a shift into the unchecked message arrangement mode may be accomplished by various methods. For example, as shown in FIG. 4A, while a list of transmitted or received messages is displayed in the screen region 162, the controller 11 may additionally display an "unreceived" button 163b in the button region 163. Then, when the "CHECKED" button 163b is selected as shown in FIG. 4B, the controller 110 may display a screen in which the $1^{st}$ region 162a for displaying unchecked messages and the $2^{nd}$ region 162b for displaying checked messages are discriminated from each other. More particularly, FIG. 4 shows all received messages not separated into regions, and upon selection of "CHECKED" button 163b, the messages are separated into the $1^{st}$ region 162a and the $2^{nd}$ region 162b.

Further, when a specific gesture, for example, a moving gesture occurs in the terminal while a list of transmitted or received messages is displayed in the screen region 162 as shown in FIG. 3B, the controller 110 may discriminatively display the $1^{st}$ region 162a displaying the unchecked messages and the $2^{nd}$ region 162b displaying the checked messages as shown in FIG. 5B.

Additionally, the specific gesture can be a sequence of gestures. As in FIG. 5A, when the initial gesture of the sequence is detected while the list of transmitted or received messages is displayed, the screen region 162 may show, a transition phase, e.g., where the images displayed on the screen region 162 move side-to-side, i.e., appear to shake, giving the user the ability to complete the gesture (and thus enter the unchecked message arrangement mode) or return to the list of transmitted or received messages.

When displaying unchecked messages in the $1^{st}$ region 162a in the unchecked message arrangement mode, the controller 110 may display the unchecked messages arranged according to predetermined priorities after determining the priorities as follows;

(1) a phone number predetermined as a favorite phone number or a phone number received more than a threshold number of times within a predetermined period among phone numbers stored in the phone book or contact list of the terminal, (2) a phone number stored in the phone book or contact list, (3) a phone number which has been received more than a threshold number of times within predetermined period but is not stored in the phone book or contact list, and (4) a phone number not stored in the phone book or contact list.

Alternatively, a priority list may be preset by a user. For example, particular contacts (as defined by the set of contact methods, e.g., home/work/mobile telephone number(s) and work/personal e-mail address(es), may be categorized as a "priority 1" contact and other contacts may be defined as "priority 2" contacts, etc., with non-categorized contacts being of the lowest priority.

The arrangement of the unchecked messages may not be employed according to the user's selection, or the priorities may be changed in the arrangement.

FIG. 6A illustrates a screen region 162 in which unchecked messages and checked messages are displayed in a single region according to when each has been received by the terminal. FIG. 6B illustrates the $1^{st}$ region 162a in which unchecked messages are arranged according to the predetermined priorities in an unchecked message arrangement mode, with the checked message being moved to the $2^{nd}$ region 162b.

Further, when the unchecked messages are arranged and displayed according to the predetermined priorities in the $1^{st}$ region 162a in the unchecked message arrangement mode, unchecked messages of high priority may be determined as important messages as shown in FIG. 7A, and the important messages a1, a2 may be highlighted or displayed with a specific icon as shown in FIG. 7B. The icon can be substituted with any visual indication, e.g., different font, shading, or a small visible vibration, designed to attract a user's attention.

Referring again to FIG. 2A, when a batch process menu is selected in the unchecked message arrangement mode, the controller 110 detects the selection in step 205. Then, in step 206, the controller 110 displays items of the batch process menu in the button region 163 of the display unit 160 and displays checkboxes for the respective unchecked messages in the $1^{st}$ region 162a.

When a specific batch menu item is selected after a corresponding checkbox is checked, the controller 110 proceeds to step 207 in which the controller 110 collectively performs the functions corresponding to the specific batch menu item.

When the batch process menu is selected in the unchecked message arrangement mode, the batch process menu (including items of spam process, delete, and read process) may be displayed in the button region 163 as shown in FIG. 8A, or an additional button region 163a may be generated between the $1^{st}$ region 162a and the $2^{nd}$ region 162b and the batch process menu (including items of spam process, delete, and read process) may be displayed on the additional button region 163a as shown in FIG. 8B.

Therefore, among the unchecked messages displayed in the $1^{st}$ region, unchecked messages with checked checkboxes may be, e.g., spam-processed (i.e., marked as spam), deleted, or collectively processed as having been read.

Further, when a specific unchecked message among unchecked messages displayed in the $1^{st}$ region 162a is selected and checked in the unchecked message arrangement mode, the controller 110 detects the selection in step 208.

Then, the controller 110 proceeds to step 209 in which the controller 110 adds and arranges the checked specific message as a last message in the $2^{nd}$ region 162b. More particularly, in step 209, the controller 110 switches a code or flag associated with the selected message displayed in the $1^{st}$ region 162a, indicating that this particular message is unread or unchecked, and changes the flag to indicate that this message has been checked or read. As a result, the particular message is moved from the $1^{st}$ region 162a to the $2^{nd}$ region 162b, where it is displayed as the last message in the $2^{nd}$ region 162b.

As a result of the movement of the checked specific message into the $2^{nd}$ region 162b, if the number of unchecked messages of the $1^{st}$ region 162a becomes less than the number predetermined for displaying in the $1^{st}$ region 162a, the controller 110 may control to reduce the size of the $1^{st}$ region 162a just enough to display current unchecked messages and to extend the size of the $2^{nd}$ region 162b equivalent to the size reduction of the $1^{st}$ region 162a to additionally display checked messages. Similarly, if movement of the checked specific message into the $2^{nd}$ region 162b brings the number of messages shown in the $1^{st}$ region 162a below the predetermined number of messages to be displayed in the $1^{st}$ region 162a, scroll bar 162a' is preferably removed.

When the specific message a2 is selected in the $1^{st}$ region 162a as shown in FIG. 9A, the specific message a2 is added to the $2^{nd}$ region 162b as a last message as shown in FIG. 9B. Further, as the checked specific message a2 is moved to the $2^{nd}$ region 162b as a last message, the number of unchecked messages becomes less than the number predetermined for displaying in the $1^{st}$ region 162a. Then, as shown in FIG. 9B, the $1^{st}$ region 162a is reduced and the $2^{nd}$ region 162b is extended. If movement of the specific message into the $2^{nd}$ region 162b brings the number of messages shown in the $2^{nd}$ region 162b above the predetermined number of messages to be displayed in the $2^{nd}$ region, scroll bar 162b' can be added to permit scrolling among the messages in the $2^{nd}$ region 162b.

In step 210 (FIG. 2B), when a line separating the $1^{st}$ region 162a and the $2^{nd}$ region 162b is dragged up to an end of the $2^{nd}$ region 162b under a condition of maintaining a touch on the separation line in the unchecked message arrangement mode, the controller 110 detects the dragging. Then, the controller 110 proceeds to step 211 in which the controller 110 displays only the unchecked messages in a screen region 162 without discrimination between the $1^{st}$ region 162a and the $2^{nd}$ region 162b. More particularly, the $2^{nd}$ region 162b is eliminated as the $1^{st}$ region is expanded to encompass the entire screen region 162.

In various exemplary embodiments of the present invention, when the $1^{st}$ region is an upper region and the $2^{nd}$ region is a lower region, the end of the $2^{nd}$ region 162b indicates the lower end of the $2^{nd}$ region.

When any one end of the screen region 162 toward a specific direction is dragged under a condition of maintaining a touch on the end while only unchecked messages are displayed in the screen region 162 of the display unit in step 211, the controller 110 may generate a line separating the $1^{st}$ region 162a and the $2^{nd}$ region 162b, arrange and display unchecked messages in the $1^{st}$ region 162a again, and display checked messages in the $2^{nd}$ region 162b.

Further, when a line separating the $1^{st}$ region 162a and the $2^{nd}$ region 162b is dragged up to an end of the $1^{st}$ region 162a under a condition of maintaining a touch on the line in the unchecked message arrangement mode, the controller 110 detects the dragging in step 212. Then, in step 213, the controller 110 releases the unchecked message arrangement mode and shifts into a message mode in which the controller 110 displays a list of received or transmitted messages according when each has been received by the terminal as shown in FIG. 3B.

In various exemplary embodiments of the present invention, when the $1^{st}$ region is an upper region and the $2^{nd}$ region is a lower region, the end of the $1^{st}$ region 162a indicates the upper end of the $1^{st}$ region.

An apparatus and a method for displaying unchecked messages of a terminal according to the present invention may be implemented as computer readable codes in a computer readable record medium. The computer readable record medium includes all kinds of record apparatuses storing data that can be readable by computer system. Examples for the record apparatuses are ROM, RAM, optical disk, magnetic tape, hard disk, nonvolatile memory, and the like, and include embodiment of a form in carrier wave for example, transmit through internet. Further, the computer readable medium may be distributed in a network connected computer system for a computer to store and execute the computer readable code in a distributed way.

An apparatus and a method for displaying unchecked messages in a terminal according to various embodiments of the present invention can clearly and concisely display unchecked messages and collectively, quickly and intuitively process unchecked messages. Further, an apparatus and a method for displaying unchecked messages in a terminal according to various embodiments of the present invention enables a user to check reception of important messages among unchecked messages.

The apparatuses and methods of the disclosure can be implemented in hardware, firmware or via the execution of software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An apparatus comprising:
a display unit configured to display a user interface having at least a first region and a second region; and
a controller configured to:
display unread messages in the first region of the display unit according to respective priorities that are assigned to the unread messages;
display read messages in the second region of the display unit;
detect an input selecting a message from among the unread messages that is displayed in the first region; and
if a number of unread messages in the first region is less than a predetermined number, expand the second region and display the selected message in the second region.

2. The apparatus of claim 1, wherein the controller is configured to shift into an unread message arrangement mode in response to at least one of a specific button selection, a specific menu selection, and a moving gesture.

3. The apparatus of claim 1, wherein the controller is further configured to display checkboxes for the unread messages in the first region when a batch process menu view is selected, and collectively process functions corresponding to a specific batch process menu item for unread messages of checked checkboxes in a batch process menu when the specific batch process menu item is selected from the batch process menu.

4. The apparatus of claim 1, wherein when a line separating the first region and the second region is dragged up to an end of the second region, the controller is configured to display only unread messages on the display unit.

5. The apparatus of claim 1, wherein the controller is configured to:
count the number of messages in the first region and display a first region scroll bar if a number of messages in the first region meets a first threshold, and
count the number of messages in the second region and display a second region scroll bar if the number of messages in the second region meets a second threshold.

6. An apparatus comprising:
a display unit for displaying a user interface having at least a first region and a second region; and
a controller configured to:
display unread messages in the first region of the display unit according to respective priorities that are assigned to the unread messages; and
display read messages in the second region of the display unit,
wherein the priorities are determined in an order of:
a phone number preset as a favorite phone number or a phone number stored in a phone book and received more than a threshold number of times within a predetermined period;
a phone number stored in the phone book;
a phone number not stored in the phone book and received more than the threshold number of times within predetermined period; and
a phone number not stored in the phone book, and
wherein the unread messages are arranged in the first region according to the priorities.

7. An apparatus comprising:
a display unit configured to display a user interface having at least a first region and a second region; and
a controller configured to:
display unread messages in the first region of the display unit according to respective priorities that are assigned to the unread messages; and
display read messages in the second region of the display unit,
wherein when a line separating the first region and the second region is dragged up to an end of the first region, the controller is configured to rearrange the messages in the first region and the second region into a single region where the messages are ordered by time received.

8. A method of displaying messages in a user interface by using a display unit having at least a first region and a second region, the method comprising:
displaying, by the display unit, unread messages in the first region of the display unit according to respective priorities that are assigned to the unread messages;
displaying, by the display unit, read messages in the second region of the display unit;
detecting, by a controller, an input selecting a message from among the unread messages that is displayed in the first region; and
if a number of unread messages in the first region is less than a predetermined number, expanding the second region and displaying the selected message in the second region.

9. The method of claim 8, wherein a shift into an unread message arrangement mode is performed in response to at least one of a specific button selection, a specific menu selection, and a moving gesture.

10. The method of claim 8, further comprising:
displaying checkboxes for the unread messages in the first region when a batch process menu view is selected; and
collectively processing functions corresponding to a specific batch process menu item for unread messages of checked checkboxes in a batch process menu when the specific batch process menu item is selected from the batch process menu.

11. The method of claim 8, further comprising, when a line separating the first region and the second region is dragged up to an end of the second region under a condition of maintaining a touch on the line, displaying only unread messages on the display.

12. The method of claim 8, further comprising:
displaying a first region scroll bar to allow for scrolling of the first region if a number of messages in the first region meets a first threshold; and
displaying a second region scroll bar to allow for scrolling of the second region, if a number of messages in the second region meets a second threshold.

13. A method of displaying messages in a user interface by using a display unit having at least a first region and a second region, the method comprising:
displaying, by the display unit, unread messages in the first region of the display unit according to respective priorities that are assigned to the unread messages; and
displaying, by the display unit, read messages in the second region of the display unit,
wherein the respective priorities are determined in an order of:
a phone number preset as a favorite phone number or a phone number stored in a phone book and received more than a threshold number of times within a predetermined period;
a phone number stored in the phone book;

a phone number not stored in the phone book and received more than the threshold number of times within predetermined period; and a phone number not stored in the phone book, and wherein the unread messages are arranged in the first region according to the priorities.

14. A method of displaying messages in a user interface by using a display unit having at least a first region and a second region, the method comprising:

displaying, by the display unit, unread messages in the first region of the display unit according to respective priorities that are assigned to the unread messages;

displaying, by the display unit, read messages in the second region of the display unit; and when a line separating the first region and the second region is dragged up to an end of the first region under a condition of maintaining a touch on the line, rearranging the messages in the first region and the second region into a single region where the messages are ordered by time received.

* * * * *